United States Patent
Asazuma

(12) 
(10) Patent No.: US 6,471,267 B2
(45) Date of Patent: Oct. 29, 2002

(54) COLLAPSIBLE FRAME FOR ENSNARING ANIMAL WASTE

(76) Inventor: Katsuya Katz Asazuma, 56 Thicket St., Irvine, CA (US) 92614

( * ) Notice: Subject to any disclaimer, the term of this patent is extended or adjusted under 35 U.S.C. 154(b) by 0 days.

(21) Appl. No.: 09/810,739

(22) Filed: Mar. 16, 2001

(65) Prior Publication Data

US 2002/0130522 A1 Sep. 19, 2002

(51) Int. Cl.$^7$ .............................. A01K 29/00; E01H 1/12
(52) U.S. Cl. ........................................ 294/1.5; 248/99
(58) Field of Search ........................... 294/1.1, 1.3, 1.4, 294/1.5, 55; 248/99–101; 15/257.1

(56) References Cited

U.S. PATENT DOCUMENTS

| | | | | |
|---|---|---|---|---|
| 4,003,595 A | * | 1/1977 | Fano et al. | 294/1.5 |
| 4,341,410 A | * | 7/1982 | Summach | 248/99 |
| 4,466,647 A | * | 8/1984 | Spevak | 294/1.5 |
| 4,875,729 A | * | 10/1989 | Peck | 15/257.4 |
| 4,900,077 A | * | 2/1990 | Beck | 248/100 |
| 5,290,080 A | * | 3/1994 | Yoshioka | 294/1.5 |
| 5,292,093 A | * | 3/1994 | Shumake | 248/152 |
| 6,126,215 A | * | 10/2000 | Jahns | 294/1.3 |

FOREIGN PATENT DOCUMENTS

| | | | | |
|---|---|---|---|---|
| DE | 3809286 | * | 9/1989 | 294/1.5 |
| FR | 2379-652 | * | 10/1978 | 294/1.4 |
| JP | 6-33429 | * | 2/1994 | 294/1.4 |

* cited by examiner

*Primary Examiner*—Dean J. Kramer
(74) *Attorney, Agent, or Firm*—Price and Gess

(57) ABSTRACT

A collapsible frame is provided for positioning a flexible membrane to capture and collect animal waste. From a folded, retracted condition capable of being stored in a pocket or easily carried, the present invention springs open using hinges that open to form a polygon frame with an open interior. The polygon frame may preferably be in the shape of a triangle, square, pentagon or hexagon, although the scope of the invention will extend to a polygon with any number of sides. The frame is used in conjunction with a flexible membrane such as, for example, a plastic bag. The flexible membrane is spread out by the expansion of the frame, and when strategically placed beneath the animal provides a snare to catch the animal waste. The frame and membrane combination provides a target for the animal, and a collection mechanism for capturing the waste. Once the waste is deposited on the flexible membrane, it can be removed from the frame and wrapped up without any human contact with the waste itself. The collapsible frame can then be retracted into a folded condition for convenient carrying of the frame.

9 Claims, 5 Drawing Sheets

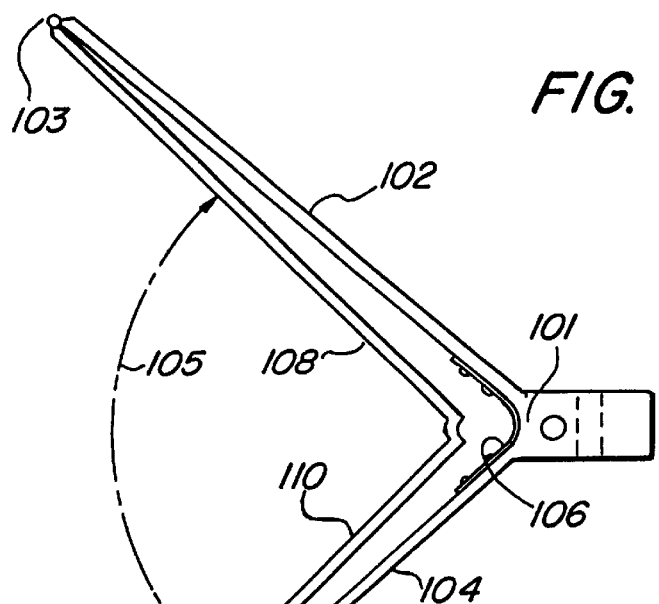
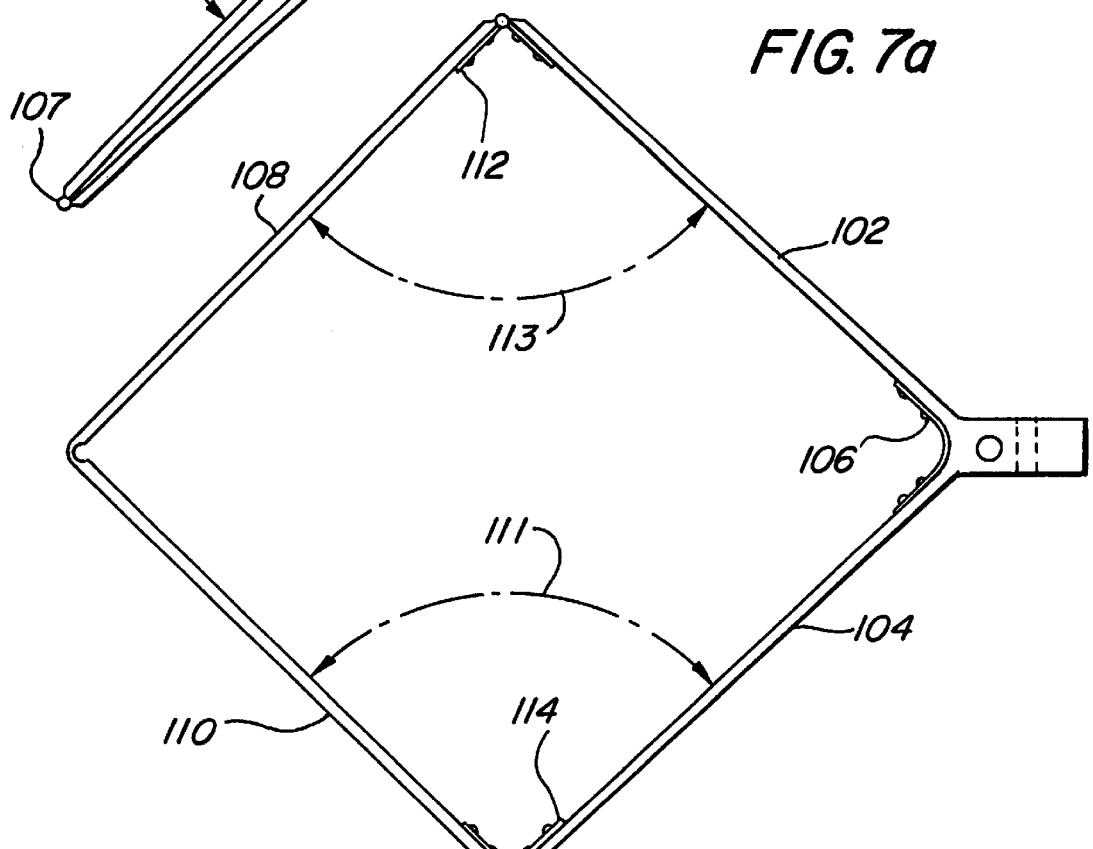
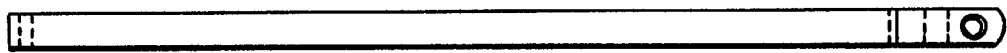

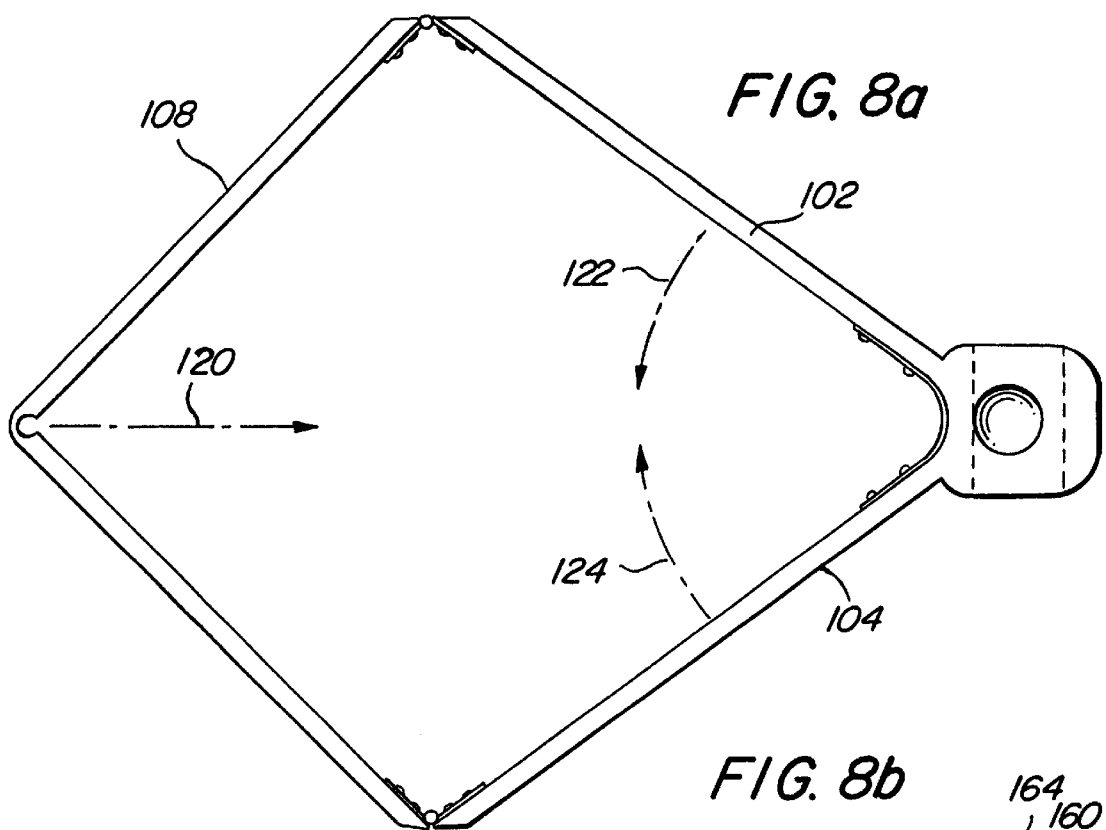
*FIG. 8a*
*FIG. 8b*
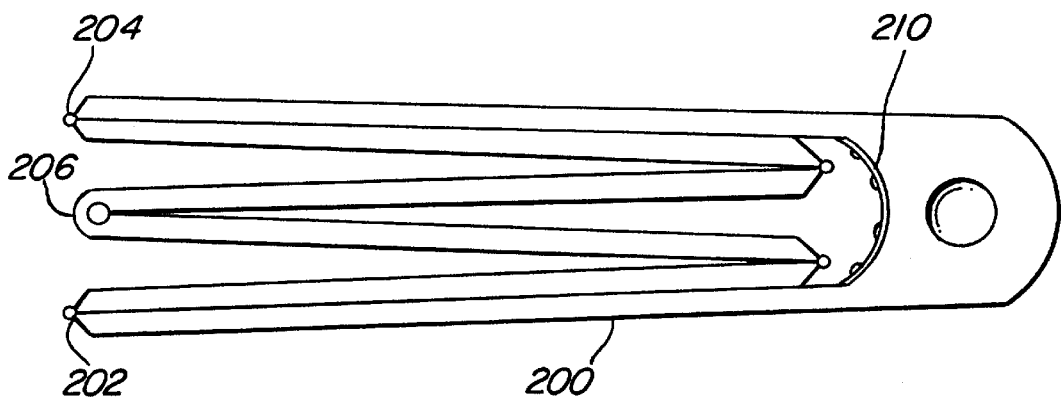
*FIG. 9*

COLLAPSIBLE FRAME FOR ENSNARING ANIMAL WASTE

BACKGROUND OF THE INVENTION

1. Field of the Invention

The present invention is directed generally to the field of animal waste disposal, and in particular to a compact and collapsible frame for capturing animal waste and performing disposal with minimal human contact.

2. Description of Related Art

A common activity in many pet owner's day is the walking of the family pet. This activity provides exercise to both the pet owner and the pet, and can provide both relaxation and a time to share with one's favorite four-legged companion. Pets who are somewhat confined during the day typically enjoy being out with their master and this promotes bonding between the pet and the pet owner.

While the experience of walking one's pet is generally enjoyable, one's responsibility to his neighbors to pick up after the pet can be a chore in an otherwise pleasant outing. Pets, especially dogs, tend to leave behind their waste where others walk. As a consequence, pet owners are tasked with removing the waste, but hygiene and sensibilities warrant that the task be performed with as little human contact as possible. This objective has been attempted in a variety of embodiments.

For example, U.S. Pat. No. 5,409,279 to Magee discloses an apparatus for picking up animal waste. Other patents include that of Boots, U.S. Pat. No. 4,315,887; Fortier, U.S. Pat. No. 4,323,272; Parvaresh, U.S. Pat. No. 5,269,575; and Vallery, U.S. Pat. No. 5,455,836. However, none of these apparatuses provide the economy, ease, and sanitary disposal of the present invention.

SUMMARY OF THE INVENTION

The present invention provides a collapsible frame for holding a flexible membrane to capture and collect animal waste. From a folded, retracted condition capable of being stored in a pocket or easily carried, the present invention springs open using hinges that open to form a polygon frame with an open interior. The polygon frame may preferably be in the shape of a triangle, square, pentagon or hexagon, although the scope of the invention will extend to a polygon with any number of sides. The frame is preferably used in conjunction with a flexible membrane such as, for example, a plastic bag ubiquitously distributed from grocery stores to carry ones groceries. The flexible membrane is spread out by the expansion of the frame, and when strategically placed beneath the animal provides a snare to catch the animal waste. The frame and membrane combination provides a target for the animal, as well as a collection mechanism for capturing the waste. Once the waste is deposited on the flexible membrane, it can be removed from the frame and wrapped up without any human contact with the waste itself. The collapsible frame can then be retracted into a folded condition for convenient carrying of the frame.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 6 is a plan view of a preferred embodiment of the present invention partially in a partially expanded condition;

FIG. 7a is a plan view of the preferred embodiment of FIG. 6 in a fully expanded condition;

FIG. 7b is a side view of the preferred embodiment of FIG. 7a;

FIG. 8a is a plan view of the preferred embodiment of FIG. 6 illustrating the procedure for collapsing the frame;

FIG. 8b is a side view of the preferred embodiment of FIG. 8a;

FIG. 9 is a plan view of a second preferred embodiment of the present invention in a collapsed condition;

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a collapsible frame for ensnaring animal waste.

Figure 1:
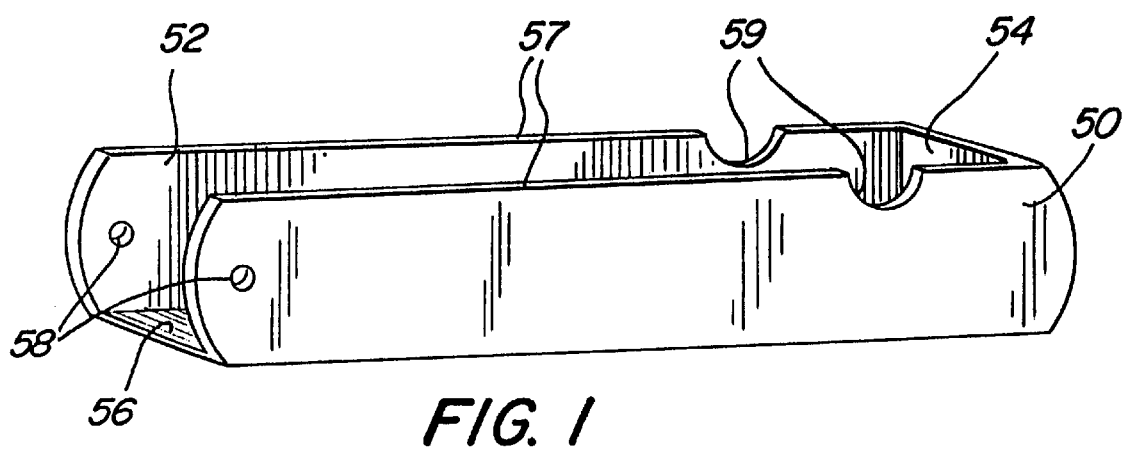
FIG. 1 is an elevated perspective view of a sheath of the present invention.

FIG. 1 illustrates a sheath 50 for the collapsible frame used to ensnare animal waste. One advantage of the present invention is the capacity of the apparatus to be collapsed into a compact space for ease in carrying the device. Here, a sheath 50 suitable for covering the collapsible frame 100 is provided so that the frame can be more easily carried or stored in a pocket and to prevent the frame from springing open accidentally when not in use. The sheath 50 is preferably made of a light-weight plastic and comprises two elongate walls 52 and a short end wall 54 forming a U-shaped member into which a slide 60 can enter. A floor panel 56 mates with the three walls 52,54 to form a compartment open along the top and at one end. Near the open end of the compartment (opposite wall 54) in the middle portion of the two elongate walls 52 is a pair of holes 58 co-linear with each other. Along an upper surface 57 of the two elongate walls 52 is a pair of semi-circular cut-outs 59 that provide access to grasp and extract the frame 100 from within the sheath 50.

Figure 2:
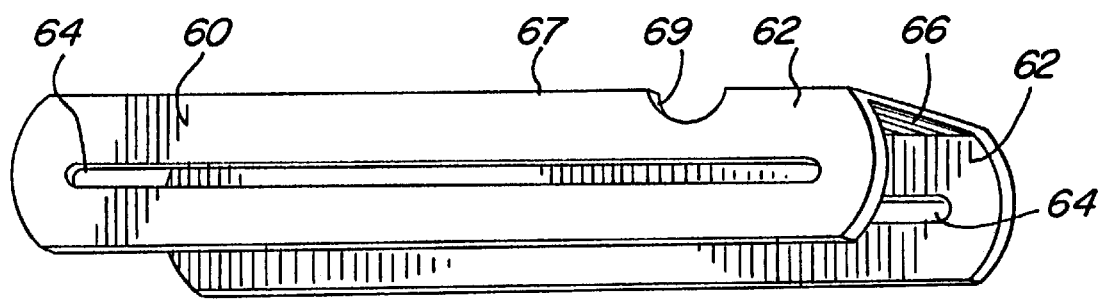
FIG. 2 is an elevated perspective view of a slide of the present invention.

FIG. 2 illustrates the slide 60 which may be used in conjunction with the sheath 50 of FIG. 1. The slide 60 has two elongate walls 62 and an upper panel 66 to form an inverted "U"-shaped profile, but lacks a side wall present in the sheath 50 such that the slide 60 is open at both ends. The slide 60 includes two elongate slots 64 acting as guides and extending substantially the length of the elongate walls 62.

Figure 3:
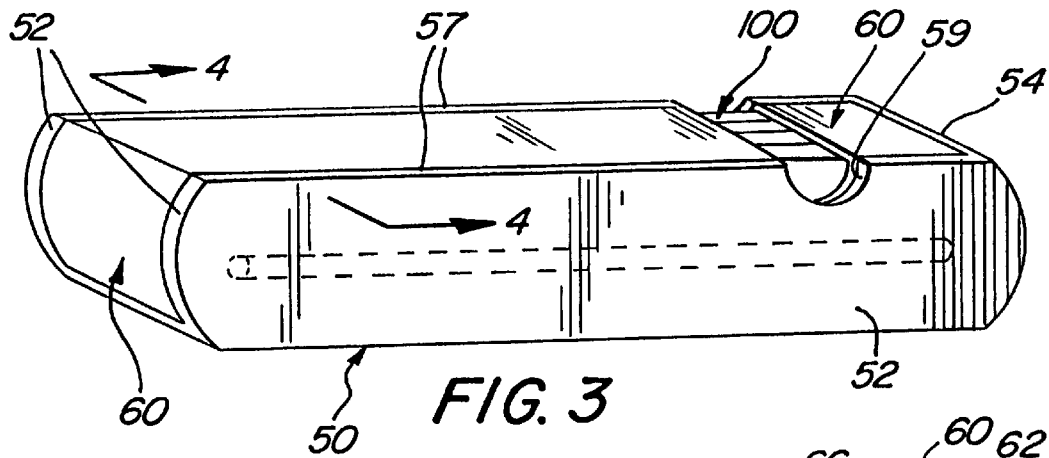
FIG. 3 is an elevated perspective view of the sheath and slide of FIGS. 1 and 2 cooperating to house the frame of the present invention.
Figure 4:
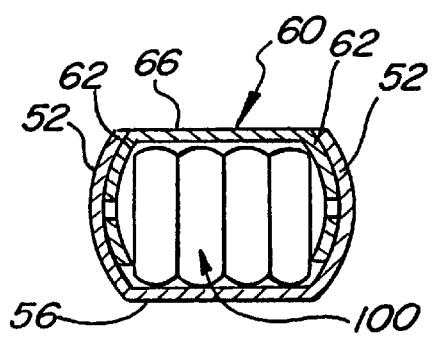
FIG. 4 is a cross-sectional view of the sheath, slide and frame of FIG. 3 taken across section line A—A.

The elongate slots have a width approximately the same as the diameter of the co-linear holes 58 in the sheath 50. The relative position of the holes 58 and the slots 64 are aligned such that a pin passing through the holes 58 will also pass through the slots 64. Along the upper surfaces 67 of the slide's elongate walls 62 are another pair of cut-outs 69 positioned to coincide with the cut-outs 59 of the sheath 50 when the slide 60 is occupied within the sheath 50. Further, as can be appreciated the slide 60 is dimensioned to fit within the sheath 50 as shown in FIGS. 3 and 4. The collapsible frame 100 can be seen in FIGS. 3 and 4 in its retracted position within the slide 60, and the panel 66 of the slide 60 cooperates with the floor panel 56 of the sheath 50 to protect and enclose the collapsible frame 100 as shown in FIG. 4.

Figure 5:
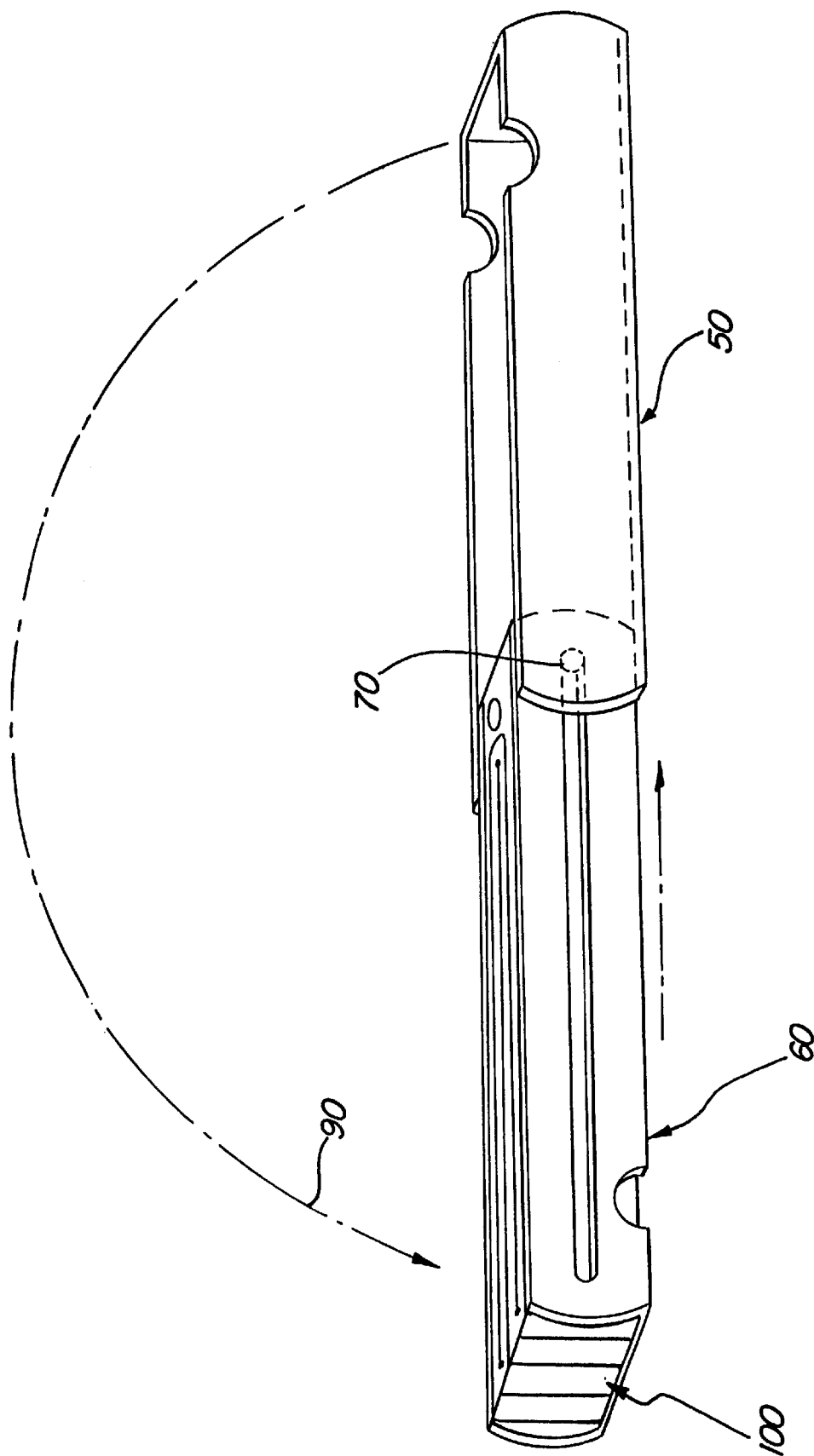
FIG. 5 is an elevated perspective view of the operation of the slide and sheath both pivoting and sliding.

In FIG. 5, the sheath 50 and slide 60 are shown together with the sheath 50 pivoted away from the slide 60 to expose the collapsible frame 100 therein. A pin 70 passing through the co-linear holes 58 provides the pivot for the sheath/slide combination. As shown from the arrow 90 in FIG. 5, to close the sheath on the slide and collapsible frame, one initially slides the sheath 50 in the direction of the longitudinal slots 64 on the frame 60 until the pins 70 contact the ends of slots, at which point the sheath 50 then pivots or rotates about the pin 70 until the sheath sits on the slide 60. In this configuration, the sheath 50 and the slide 60 occupy the position shown in FIG. 4 and protect and house the frame 100 therebetween.

FIGS. 6–8 illustrates plan views of a first embodiment of a frame 100 in its semi-extended and extended configuration. A hinge 106 mounted at the base 101 of the frame 100 performs a spring function to cause the two branches 103, 107 of the frame 100 to diverge open in a "Y" configuration as shown by the arrow 105 in FIG. 6. Prior to the diverging of branches 103, 107 each adjoining side of the polygon lie adjacent to each other in a compact stack. The hinge 106 can be a metal spring hinge known to those well versed in hinge technology, or may also be formed of a resilient plastic such as polypropylene. The plastic hinge has the benefit of being lighter than the metal hinge counterpart, which may be a factor when the invention is carried or held in a pocket that may rip if the invention is too heavy. Once the frame is opened in the Y-shaped configuration, two opposed hinges 112, 114 connecting sides 102 with 108, and 104 with 110, respectively, operate to open the frame 100 in a like manner into a square polygon as indicated in FIG. 7 by arrows 111, 113. As shown in FIG. 8, the self-expanding frame can easily be folded back in the retracted configuration by positioning the sides of the frame as indicated by arrows 120, 122, 124 initially back to the Y-shaped configuration, and then folding the Y-shaped projections into the linear retracted position.

FIG. 8 illustrates another feature of the present invention, wherein an end of the frame 160 includes a "C"-shaped clip 162 configuration which is used to removably attach a flexible membrane to the frame for convenience. That is, a flexible membrane such as a grocery bag can be folded and wedged into the C-shaped portion of the frame to provide a convenient location to store the flexible membrane. Moreover, a dimple 164 (shown in hidden) or other insignia can be placed on the top portion of the end of the clip 160 to orient the frame is an upright position. This may be helpful when the bag is placed over the frame to establish which direction the frame should be held such that the bag does not fall off the frame. The use of a dimple allows the user to feel the dimple through the bag while holding the frame, and determine which orientation is the proper orientation.

Figure 10:
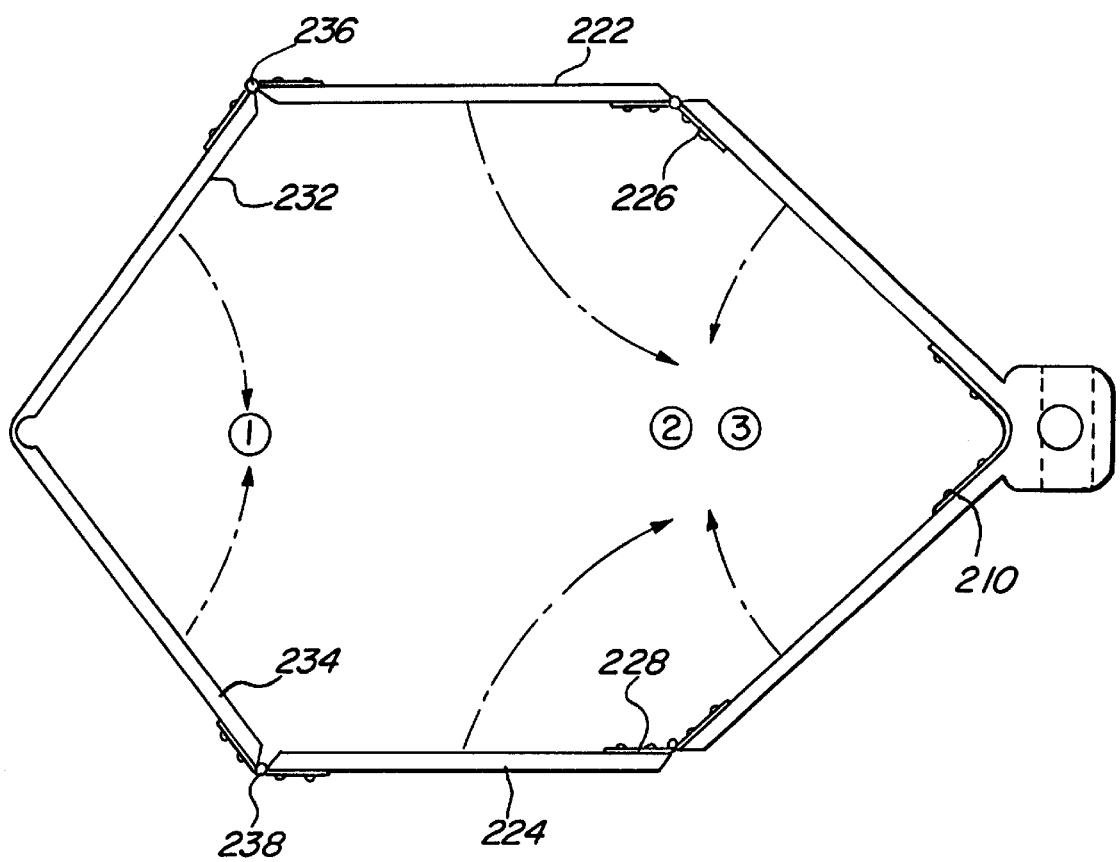
FIG. 10 is a plan view of the embodiment of FIG. 9 in an open condition.
Figure 11:
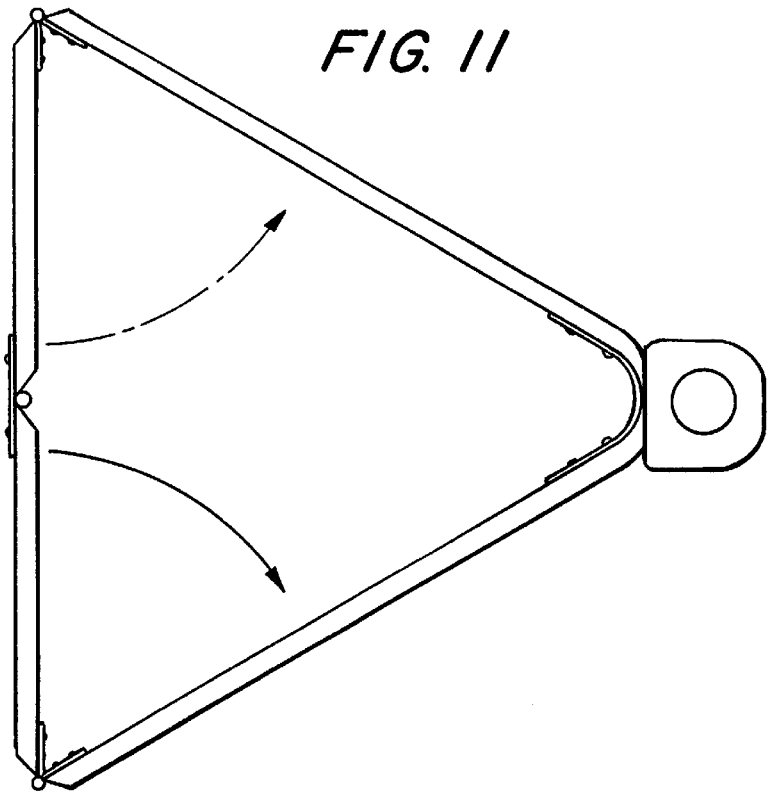
FIG. 11 is a plan view of a third preferred embodiment of the present invention.

In a similar fashion, FIGS. 9 and 10 illustrate a second embodiment using a hexagonal shaped frame 200 instead of a square frame. The two additional sides necessitates two additional hinges as shown. FIG. 9 shows the frame 200 in a W-shaped retracted position prior to the main hinge 206 spreading the two outside members apart. Initially, main hinge 210 diverges branches 202, 204 apart, and then side frame members 222,224 spring open from the force of hinges 226, 228 respectively. Finally, forward frame walls 232,234 open as a result of hinges 236, 238 to from a hexagonal frame member. FIG. 11 demonstrates that the invention works for a minimum of three sides, up to an unlimited number of sides.

The operation of the invention will now be described in more detail. When walking a pet, such as for example, a dog, the animal will tend to start sniffing around areas and arching its back prior to evacuating. This is a tip to the owner that the invention may be needed soon. If the dog should enter a squatting position, the sheath 50 and slide 60 are removed from the frame exposing the retracted frame. While the frame is still retracted, a flexible membrane is loosely placed over the frame to allow for the expansion of the frame. The frame is then allowed to expand using the spring hinges, simultaneously spreading the flexible membrane across the frame to form the snare for capturing the waste from the pet. Placed beneath the pet's posterior, the waste is allowed to fall onto the membrane over the frame. Once finished, the flexible membrane is removed from the frame and folded or wrapped up with the waste inside. The entire procedure requires no touching, scooping, or handling of the waste— only the flexible membrane is touched in disposing of the waste.

Those skilled in the art will appreciate that various adaptations and modifications of the just-described preferred embodiment can be configured without departing from the scope and spirit of the invention. For example, the frame may be attached to a handle for maneuverability in positioning the frame member, and the flexible membrane may be attached to the frame member in a more rigid manner, e.g. using clips or tape. Further, instead of spring hinges a metal or other material with a shape memory can be used to provide a collapsible frame. Therefore, it is to be understood that, within the scope of the appended claims, the invention may be practiced other than as specifically described herein.

What is claimed is:

1. A collapsible frame for positioning a flexible membrane used to collect animal waste comprising:

a plurality of sides arranged to form a frame in the shape of a polygon, said polygon is in the shape of a hexagon, each two adjoining sides of said frame connected by a hinge permitting the adjoining sides to pivot away from each other in an open position and together in a closed position;

wherein said frame, when all adjoining sides are in a closed position, align all sides of the frame to be substantially parallel and a length of the frame in the closed position is no longer than a length of the longest side.

2. A device for ensnaring animal waste comprising:

a collapsible frame comprising a plurality of side members each connected at first and second ends to another one of said plurality of sides, said connection providing the connected side members to align adjacent to one another in a closed position and pivoted apart from one another in an open position, such that a hexagon is formed where each of the pairs of sides is pivoted in the open direction and where the plurality of sides forms a stack where each of the pairs of sides is pivoted in the closed position; and, a flexible membrane placed over the collapsible frame and adapted to collect animal waste inside the frame when the frame forms a hexagon.

3. A device for ensnaring animal waste comprising:

a collapsible frame comprising a plurality of side members each connected at first and second ends to another one of said plurality of sides, said connection providing the connected side members to align adjacent to one another in a closed position and pivoted apart from one another in an open position, such that a polygon is formed where each of the pairs of sides is pivoted in the open direction and where the plurality of sides forms a stack where each of the pairs of sides is pivoted in the closed position;

a flexible membrane placed over the collapsible frame and adapted to collect animal waste inside the frame when the frame forms a polygon;

a slide member adapted to fit over said frame when said frame is in a closed position; and, a sheath adapted to fit over said frame when said frame is in the closed position.

4. The device of claim 3 wherein the sheath and the slide are connected in a sliding relationship.

5. The device of claim 4 wherein the sheath and the slide are further connected in a pivoting relationship.

6. A collapsible frame for positioning a flexible membrane used to collect animal waste comprising:

a plurality of sides arranged to form a frame in the shape of a polygon, each two adjoining sides of said frame connected by a hinge permitting the adjoining sides to pivot away from each other in an open position and together in a closed position;

wherein said frame, when all adjoining sides are in a closed position, align all sides of the frame to be substantially parallel and a length of the frame in the closed position is no longer than a length of the longest side; and, said frame further comprising a "C" shaped end portion adapted to secure a flexible membrane therein.

7. The device of claim 6 further including a dimple on a surface for orienting the collapsible frame in a particular orientation.

8. A collapsible frame for collecting animal waste comprising:

at least six rigid segments joined at respective ends to form a continuous polygon, said rigid segments connected by hinges to permit pivoting between respective connected rigid segments, at least one hinge biased to spring apart two connected rigid segments.

9. The collapsible frame of claim 8 wherein said at least six rigid segments collapse from a continuous polygon to a stack comprising two outer rigid segments and a plurality of inner segments, said inner segments each having a common length and shape.

\* \* \* \* \*